May 31, 1949.   T. HOTCHKISS, SR   2,471,689
TRAILER COUPLING
Filed Sept. 27, 1946

INVENTOR:
THOMAS HOTCHKISS, Sr
BY
ATTORNEY.

Patented May 31, 1949

2,471,689

UNITED STATES PATENT OFFICE 2,471,689

TRAILER COUPLING

Thomas Hotchkiss, Sr., St. Louis, Mo.

Application September 27, 1946, Serial No. 699,836

9 Claims. (Cl. 280—33.15)

This invention relates to couplings for connecting a trailer to a towing vehicle and in its more specific aspects is directed to a coupling whose parts will readily align and be free from binding even though there is some displacement in a vertical plane between the axles of the trailer and the towing vehicle wheels.

The object of this invention is to provide a coupling to connect a trailer and a towing vehicle and in which the pin connecting the separable parts may be readily removed and inserted even though there may be some displacement in a vertical plane of the trailer with respect to the towing vehicle and which still enables one part of the coupling to have a considerable degree of universal motion relative to the other part.

In the drawings Figure 1 shows an elevational view of a towing vehicle and trailer incorporating the invention;

Figure 1:
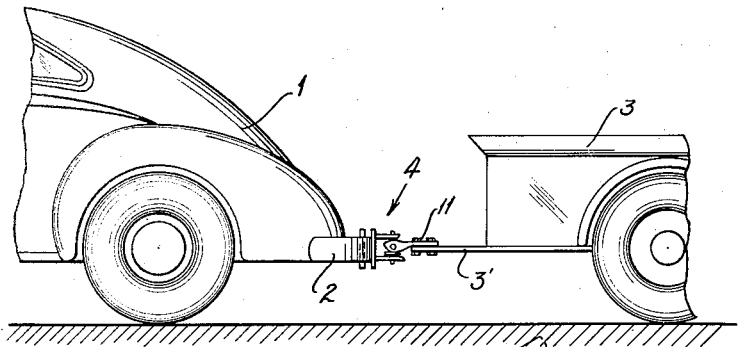
Figure 7:
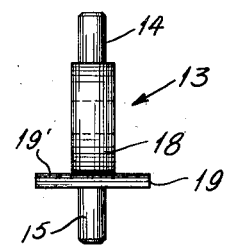
Figure 7 shows an end elevational view of the coupling pin.

Referring now to the drawings, numeral 1 designates a towing vehicle having a conventional bumper 2 secured thereto and 3 designates a trailer vehicle connected to the towing vehicle 1 by means of the improved coupling 4.

The coupling 4 consists of two vertically spaced horizontally disposed members 5 and 6 which are secured to bumper 2, the spacing being provided by a pair of suitably apertured members 7 and 8, members 5 and 6 having threaded tangs 5', 6' which extend through said apertures and with bumper 2 disposed between members 7 and 8. Nuts 9 and 10 are provided on the tangs to securely lock the several members 5, 6, 7, and 8 to bumper 2.

Figures 3, 6:
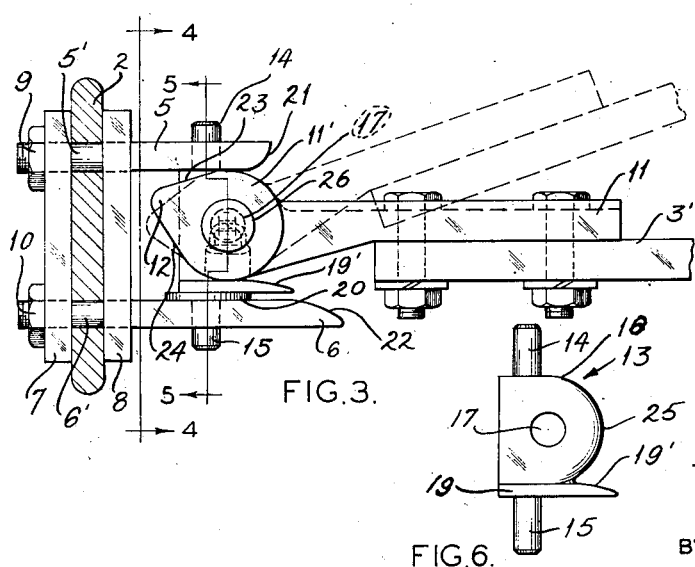
Figure 3 shows a side elevational view of the coupling.
Figure 6 shows a side elevational view of the coupling pin.
Figure 5:
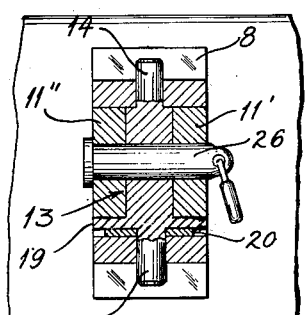
Figure 5 shows a sectional view taken along the line 5—5 of Figure 3.

The trailer 3 is provided with a tongue 3' to which coupling member 11 is secured. This member is divided or forked at its free end into two elements 11' and 11", each of which is shaped as illustrated in Figure 3 to provide a forwardly extending eccentric portion 12.

A pin 13 is rotatably supported in members 5 and 6 on a vertical axis and has cylindrical elements 14 and 15 thereon which are received in suitable apertures in members 5 and 6. The pin has an enlargement thereon whose upper surface is adapted to bear against the lower side of member 5, said enlargement 18 being in the form of a flat-sided block adapted to be received between members 11', 11". An aperture 17 is drilled in the enlargement 18 whose longitudinal axis is displaced from the longitudinal axis of cylindrical elements 14 and 15 and is to be aligned with the apertures in elements 11' and 11". A table 19 provided with a tapered surface 19' is disposed below the enlargement 18. A suitable spacer 20 may be placed between table 19 and member 6 although the thickness of this spacer may be added to the enlargement 18. Pin 13, because of enlargement 18, does not have vertical movement and rotates in only one plane.

Referring now to the operation of the coupling and assuming trailer 3 to be uncoupled, the towing vehicle 1 is backed up to the trailer whose tongue 11 is now elevated to approximately align it with the spaced members 5 and 6. The coupling members are brought into engagement with each other by having enlargement 18 disposed between elements 11' and 11". To facilitate the coupling action, members 5 and 6 are curved as shown at 21 and 22. The angular surfaces 23 and 24 on elements 11' and 11" selectively engage surfaces 21 or 22 to finally align the enlargement 18 with elements 11' and 11" to present enlargement 18 therebetween. As this action takes place the surface 24 on elements 11' and 11" cause the latter to ride up on the surface 19' so that when aperture 17 is aligned with the apertures in elements 11' and 11" the latter rest on table 19. The surface 25 on enlargement 18 contacts the base of forked elements 11' and 11" thereby placing said apertures in alignment after which pin 26 is inserted and also preventing binding of pin 26 except when the trailer is being drawn by the towing vehicle.

Figure 2:
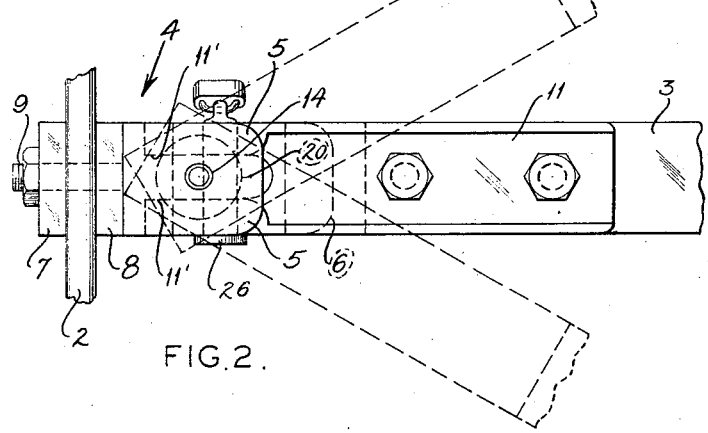
Figure 2 shows a plan view of the coupling.
Figure 4:
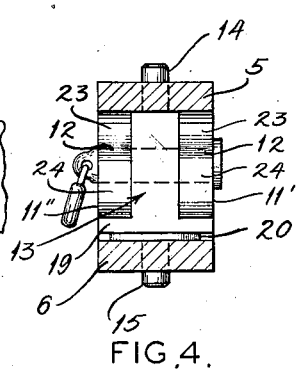
Figure 4 shows a sectional view taken along the line 4—4 of Figure 2.

The pin 26 may be easily removed from said apertures whether or not the trailer 3 and towing vehicle 1 are standing in the same plane. The elements 11' and 11" rest upon table 19 to maintain the pin aperture alignment aided by the surface 25 contacting the root of the fork on member 11 and also because surfaces 23 and 24 limit the rotational motion of member 11 about pin 26 in a vertical plane. The dotted lines in Figures 2 and 3 show that member 11 can and does move in two different planes. The circular portions of elements 11' and 11" not only bear on table 19 but also bear on the lower surface of member 5 to prevent vertical movement thereof and binding on pin 26. It is clear, therefore, that member 11 will always be capable of universal movement relative to elements 5 and 6; that there will be no binding on pin 26; and that the coupling parts will always be properly aligned before the parts are brought into engagement.

Having fully described my invention, that which I claim as novel and desire to protect by Letters Patent of the United States is:

1. A trailer coupling comprising a pair of horizontally disposed and vertically spaced members securable to a towing vehicle; a member securable to a trailer; a pin supported in said members and rotatable on a vertical axis; a table formed on said pin; forked means on said member adapted to rest on said table and operatively associated with said pin; and a second pin extending through said first mentioned pin and said means, said second pin freely movable when the vehicle is at rest.

2. A trailer coupling comprising a pair of spaced members securable to a towing vehicle; a member provided with a forked end and securable to a trailer; a pin having a table thereon rotatably supported in said spaced members and having a portion receivable between the forks of said forked member, said forks resting on said table when they are in operative association with said portion; and a second pin extending through said portion and said forks, said second pin freely removable even though said trailer and towing vehicle are not disposed in the same plane.

3. A trailer coupling comprising a pair of spaced members securable to a towing vehicle; a pin rotatably supported in said members on a vertical axis and having a table and an enlargement formed thereon; a member securable to a trailer and having a forked end thereon between which said enlargement is received, said forks being so constructed that substantially diametrically opposite portions thereof engage said table and one of said members, said forks on said member and said pin preventing tipping of said member relative to said spaced members; and a coupling pin to maintain said member and said pin operatively engaged.

4. A trailer comprising a pair of spaced members securable to a towing vehicle; a pin rotatably supported in said members on a vertical axis; a table and an enlargement on said pin; and a member having a forked end and securable to a trailer, said forked end resting on said table and embracing said enlargement to prevent said member tipping with respect to said spaced members.

5. A trailer comprising a pair of spaced members securable to a towing vehicle; a pin rotatably supported in said members on a vertical axis; a table and an enlargement on said pin; and a member having one end forked and securable to a trailer, the forked end of said member constructed so that it bears on one of said spaced members and on said table, said enlargement received in said forked end, said enlargement, said table and said forked end enabling said member to swing even though the trailer and the towing vehicle do not stand in the same plane.

6. A trailer coupling comprising a pair of horizontally disposed and vertically spaced members securable to a towing vehicle; a member securable to a trailer; a pin rotatably supported in said members on a vertical axis; a table on said pin; and spaced means on said second member adapted to rest on said table to enable said member to thereby freely swing with respect to said spaced members.

7. A trailer coupling comprising a pair of horizontally disposed and vertically spaced members securable to a towing vehicle, one of the members having a curved forward edge; a member provided with a forked end and securable to a trailer; a pin having a table thereon provided with a curved edge complemental to the curved edge on said member and rotatably supported in said spaced members on a vertical axis, said pin having a portion receivable between the forks of said forked member, said forked end riding up said curved surfaces and resting on said table when the coupling members are operatively associated with said portion; and second pin extending through said forked end and said portion, and freely removable when said trailer and towing vehicle are not standing on the same plane.

8. A trailer coupling comprising a pair of horizontally disposed and vertically spaced members securable to a towing vehicle, one of the members having a curved forward edge; a pin rotatably supported in said members on a vertical axis and provided with a table having a curved forward edge complemental to the curved edge on said member, said pin having an enlargement thereon; a member securable to a trailer and having a forked end between which said enlargement is received after said forked end rides up said curved surfaces to rest on said table, one side of said forked end engaging the other of said horizontal members, said forked end on said member and said enlargement preventing tipping of the forked member relative to said spaced members; and a coupling pin insertable in said forked end and in said enlargement when operatively engaged and freely removable when the towing vehicle and trailer are at rest.

9. A trailer coupling comprising a pair of horizontally disposed and vertically spaced members securable to a towing vehicle, one of said members having a curved forward edge; a pin provided with a table having a curved forward edge complemental to the curved edge on said member and rotatably supported in said members on a vertical axis; an enlargement on said pin; a member securable to a trailer and provided with a forked end in which said enlargement is received after said forked end rides up said curved surfaces and onto said table; and a second pin extending through said forked end and said enlargement and freely movable therein while said towing vehicle and said trailer are at rest.

THOMAS HOTCHKISS, Sr.

REFERENCES CITED

The following references are of record in the file of this patent:

UNITED STATES PATENTS

| Number | Name | Date |
|---|---|---|
| 1,229,465 | Hudson | June 12, 1917 |
| 1,730,077 | Isachsen | Oct. 1, 1929 |
| 2,027,499 | Tully | Jan. 14, 1936 |

FOREIGN PATENTS

| Number | Country | Date |
|---|---|---|
| 219,086 | Great Britain | July 18, 1924 |